July 8, 1941.   L. J. BLAND   2,248,420
TIRE LUG CHAIN
Filed May 1, 1939
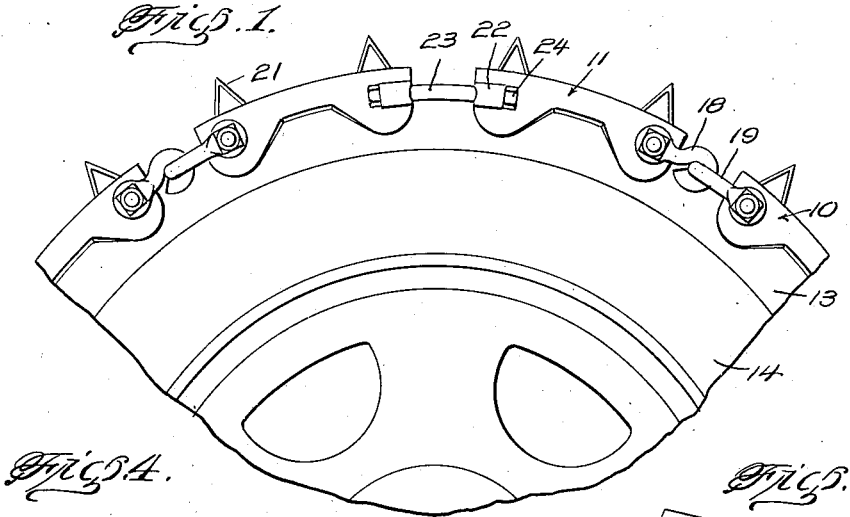
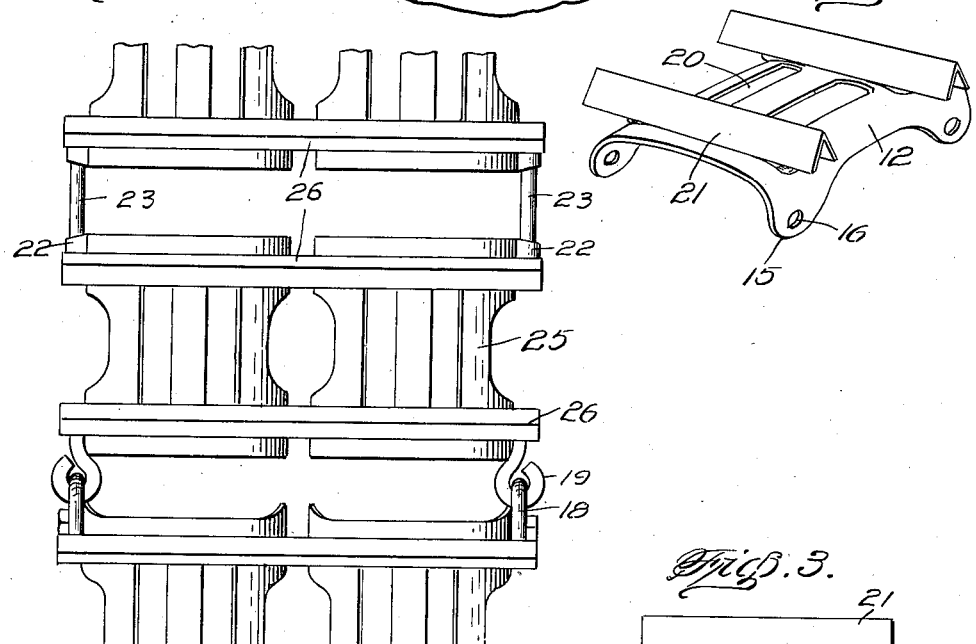
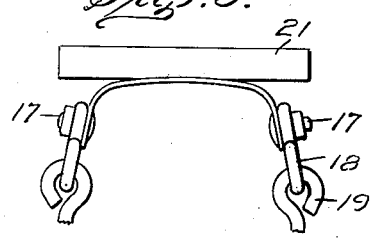
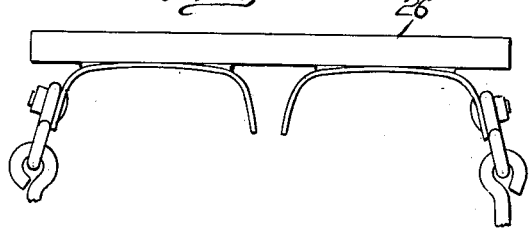
Leo J. Bland, INVENTOR
BY Victor J. Evans & Co.
ATTORNEYS Patented July 8, 1941

2,248,420

UNITED STATES PATENT OFFICE 2,248,420

TIRE LUG CHAIN

Leo J. Bland, Orangefield, Tex.

Application May 1, 1939, Serial No. 271,181

3 Claims. (Cl. 152—220)

The invention relates to a tire chain and more especially to lug chains for vehicle tires functioning as an antiskid device or appliance.

The primary object of the invention is the provision of a device of this character, wherein the tread of a vehicle wheel of the resilient or pneumatic tire type will be protected or armored and at the same time lugs are projected to grip a surface on which the wheel travels to prevent skidding thereof, the device being of novel construction and is readily and easily applied to the tread of a vehicle wheel to be worn thereby.

Another object of the invention is the provision of a device of this character, wherein the lugs are rigidly supported yet the device is susceptible of flexibility for proper tread action in the use of the device and for antiskid purposes.

A further object of the invention is the provision of a device of this character, which is simple in its construction, thoroughly reliable and efficient in operation, readily and easily applied to and removed from a tired vehicle wheel and eliminates the necessity of anchoring chains or the like, strong, durable, and inexpensive to manufacture.

With these and other objects in view, the invention consists in the features of construction, combination and arrangement of parts as will be hereinafter more fully described in detail, illustrated in the accompanying drawing, which discloses the preferred and modified forms of embodiment of the invention and pointed out in the claims hereunto appended.

In the accompanying drawing:

Figure 1 is a fragmentary side elevation of a tired vehicle wheel showing the device constructed in accordance with the invention applied, only a portion of the device being disclosed.

Figure 2 is a perspective view of one of the units of the device.

Figure 3 is an edge elevation thereof.

Figure 4 is a plan view of a modified form of construction.

Figure 5 is a fragmentary elevation thereof.

Similar reference characters indicate corresponding parts throughout the several views in the drawing.

Referring to the drawing in detail, particularly Figures 1 to 3, inclusive, the device constituting the present invention comprises a series of intermediate units and terminal units 10 and 11, respectively, each in the form of an outwardly arched tread plate 12, the arched formation being constant with the tread area 13 of a tire, a portion thereof being indicated at 14, for a vehicle wheel. At opposite sides of this plate, that is, the intermediate units of the device, are formed ears 15 having perforations 16 each for a fastener 17. These fasteners swingingly connect thereto link parts 18 and 19, respectively, being loosely connected with each other and flexibly join or couple the tread plates 12 adjacent to each other.

These plates 12 are formed with spaced slots 20 disposed circumferentially with respect to the tire 14 when the said plates 12 are worn thereby. Transversely of each tread plate 12 and projecting outwardly therefrom are outwardly tapered substantially inverted V-shaped lugs 21, these being extended slightly beyond opposite sides of the said plate 12 and function for antiskid purposes.

The terminal units 11 each at one end and at opposite sides thereof has formed thereon bolt-receiving sleeves 22 for accommodating tie bolts 23, being nut-carrying bolts, and each nut is indicated at 24. Each terminal unit 11 at the other end thereof is equipped with the links 18, as hereinbefore described, and in this manner the chain is set up by the units 10 and 11 and when applied to the tire as shown in Figure 1 will be firm thereon yet freely flexible and operates as an antiskid appliance or device.

In Figures 4 and 5 of the drawing there is shown a slight modification wherein tread plates 25, these being identical to the tread plates 12 heretofore set forth, are arranged in pairs spaced from each other side by side and these pairs of plates carry the cross lugs 26. The side by side plates 25 are for armoring twin tired vehicle wheels commonly employed on trucks or the like.

The tread 13 of the tire 14, when wearing the chain, will become seated in the tread plates and these will not become displaced laterally to opposite sides of the tire due to the conformation of the said plates and the chain when worn by the tire will function as an armor therefor and at the same time serve as an antiskid device.

What is claimed is:

1. A tire lug chain, composed of a series of units flexibly connected together, each unit formed of two outwardly arched tread plates spaced apart and having the arch constant with the tread of the tire and parallel with each other in the same plane, and straight bars forming calks rigidly secured to the outer faces of the arched tread plates and rigidly connecting the same together.

2. A tire lug chain, composed of a series of units flexibly connected together, each unit formed of two outwardly arched tread plates spaced apart and having the arch constant with the tread of the tire and parallel with each other in the same plane, and straight bars forming calks rigidly secured to the outer faces of the arched tread plates and extending beyond the side edges thereof and rigidly connecting the same together.

3. A tire lug chain, composed of a series of units flexibly connected together, each unit formed of two outwardly arched tread plates spaced apart transversely of the tire and having the arch constant with the tread of the tire and parallel with each other in the same plane, and a straight inverted V-shaped bar forming a calk rigidly secured to the outer face of the arched tread plates at each end for rigidly connecting the same together.

LEO J. BLAND.